(12) United States Patent
Kühn et al.

(10) Patent No.: US 7,259,799 B2
(45) Date of Patent: Aug. 21, 2007

(54) AGC DETECTOR AND METHOD FOR AGC DETECTING

(75) Inventors: Hans-Jürgen Kühn, Buchholz (DE); Manfred Zupke, Hamburg (DE)

(73) Assignee: NXP B.V., Eindhoven (NL)

( * ) Notice: Subject to any disclaimer, the term of this patent is extended or adjusted under 35 U.S.C. 154(b) by 441 days.

(21) Appl. No.: 10/503,686

(22) PCT Filed: Feb. 3, 2003

(86) PCT No.: PCT/IB03/00399

§ 371 (c)(1),
(2), (4) Date: Aug. 4, 2004

(87) PCT Pub. No.: WO03/067877

PCT Pub. Date: Aug. 14, 2003

(65) Prior Publication Data

US 2005/0088367 A1 Apr. 28, 2005

(30) Foreign Application Priority Data

Feb. 9, 2002 (EP) .................................. 02002917

(51) Int. Cl.
*H04N 5/52* (2006.01)
(52) U.S. Cl. ........................ 348/684; 348/682
(58) Field of Classification Search ................ 348/678, 348/684, 528, 689, 682, 683
See application file for complete search history.

(56) References Cited

U.S. PATENT DOCUMENTS 3,560,648 A * 2/1971 Kitsopoulos ................ 348/684
4,212,032 A * 7/1980 Harford ....................... 348/683
4,214,260 A * 7/1980 van Straaten ................ 348/544
4,472,739 A * 9/1984 Kishida et al. .............. 348/684
4,667,242 A * 5/1987 Hagino ........................ 348/678
6,188,832 B1 * 2/2001 Ryan ............................ 386/94

* cited by examiner

*Primary Examiner*—Michael H. Lee

(57) ABSTRACT

Disclosed is an AGC detector device and an AGC detecting method for television receivers displaying video pictures consisting of a plurality of horizontal lines to be built up successively, wherein a CVBS signal is inputted which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period. Further, gating pulses are generated having a period which is equal to the line period of the horizontal sync pulses. Said gating pulses are adjusted such that they occur at the back porch region of the horizontal sync pulses. The particularity of the invention is that the occurrence of the gating pulses is shifted during the serration pulse region of the vertical sync period so that the gating pulses occur earlier by a time interval corresponding to the time distance between a front porch region and the next back porch region or later by a time interval corresponding to the time distance between a back porch region and the next front porch region.

10 Claims, 6 Drawing Sheets

AGC DETECTOR AND METHOD FOR AGC DETECTING

The present invention relates to an AGC (automatic gain control) detector device for television receivers displaying video pictures consisting of a plurality of horizontal lines to be built up successively, comprising means for inputting a CVBS (color video blanking sync) signal which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period, means for generating gating pulses having a period which is equal to the line period of the horizontal sync pulses, and means for adjusting said gating pulses such that they occur at the back porch region of the horizontal sync pulses.

Further, the present invention relates to a method for AGC detecting for television receivers displaying video pictures consisting of a plurality of horizontal lines to be built up successively, comprising the steps of inputting a CVBS signal which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period, generating gating pulses having a period which is equal to the line period of the horizontal sync pulses, and adjusting said gating pulses such that they occur at the back porch region of the horizontal sync pulses.

A so-called digital black level (back porch) automatic gain control for television receivers is already known, wherein the horizontal line frequency is used to determine the level at the back porch region of a video output signal. This is compared to a reference level for black, and the difference is the resulting loop gain error. The resulting loop gain error is integrated, digital/analog-converted and finally applied to an analog AGC amplifier via an analog non-critical first-order post filter in order to keep the video output voltage constant.

However, in some particular conditions the video output voltage is affected by a negative effect called "airplane flutter" which results from changing multi-path reception. In particular, due to this negative effect the video output voltage is not kept on a constant level any time, but varying, and sometimes the video output voltage is completely distorted. This negative effect leads to a considerable reduction of picture and sound quality.

The serration pulse region which is part of the vertical sync period (=19 to 25 line periods depending on the television standard) is a particularly critical period, because the serration pulses have no back porch region, rather the sync peak, but the gating pulses are synchronized in accordance with the back porch region of the horizontal sync pulses.

Therefore, in the conventional AGC detectors the horizontal gating procedure is kept or freezed during the above critical period. However, this produces visible interferences in the picture under the above-mentioned field conditions.

Also known is the disabling of the gating during the serration pulse region. However, the result is a wrong AGC action in an annoying way in case of a fast AGC response requirement. Namely, when the gating is interrupted during the serration pulse region, which lasts 2.5 to 3 line periods for all television standards, the automatic gain control cannot react to the airplane flutter effect during that time period. As a consequence the video output level will vary accordingly resulting in a changing picture contrast or even loss of synchronization.

It is an object of the present application to provide an automatic gain control detector device and a method for automatic gain control detecting which are fast enough to follow airplane flutter reception conditions with still good picture and sound impression.

In order to achieve the above and further objects, in accordance with a first aspect of the present invention, there is provided an AGC detector device for television receivers displaying video pictures consisting of a plurality of horizontal lines to be built up successively, comprising means for inputting a CVBS signal which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period, means for generating gating pulses having a period which is equal to the line period of the horizontal sync pulses, and means for adjusting said gating pulses such that they occur at the back porch region of the horizontal sync pulses, characterized by means for shifting the occurrence of said gating pulses during the serration pulse region of the vertical sync period so that the gating pulses occur earlier by a time interval corresponding to the time distance between a front porch region and the next back porch region or later by a time interval corresponding to the time distance between a back porch region and the next front porch region.

In accordance with a second aspect of the present invention, there is provided a method for AGC detecting for television receivers displaying video pictures consisting of a plurality of horizontal lines to be built up successively, comprising the steps of inputting a CVBS signal which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period, generating gating pulses having a period which is equal to the line period of the horizontal sync pulses, and adjusting said gating pulses such that they occur at the back porch region of the horizontal sync pulses, characterized by the further step of shifting the occurrence of said gating pulses during the serration pulse region of the vertical sync period so that the gating pulses occur earlier by a time interval corresponding to the time distance between a front porch region and the next back porch region or later by a time interval corresponding to the time distance between a back porch region and the next front porch region.

So, the present invention provides a new AGC detector device and a new method for AGC detecting which are fast enough to follow airplane flutter reception conditions with still good picture and sound impression. This is achieved by gating the serration pulse region with multiple (in particular three) time shifted horizontal sync pulses and by taking the error signal from the front porch measurement. In other words, the gating is changed from back porch to front porch during the serration pulse region of the vertical sync period which lasts 19 to 25 line periods depending on the television standard. As a result, obtained is a high speed response which is necessary to control the video output signal during airplane flutter and, thus, to keep it on a constant level anytime. So, it is assured by the present invention that the AGC loop stays closed all the time and can, thus, function with good performance.

After all, an advantage of the present invention is that television receivers create good picture and sound impression even under high velocity e.g. in cars. So, the present invention is in particular convenient for mobile television.

Further advantageous embodiments of the present invention are defined in the dependent claims.

Preferably, provided are first means for detecting the occurrence of the back porch region of the horizontal sync pulses, and second means for detecting the occurrence of the front porch region of the horizontal sync pulses, wherein said first and second detecting means are coupled to said shifting means and at least said first detecting means is coupled to said adjusting means.

In a still further preferred embodiment, the device is a digital AGC detector device. Namely, the change of the gating from back porch to front porch during the serration pulse region can be done easily because it can happen in the digital domain.

In particular, the present invention can be provided for analog television receivers.

Preferably, the gating pulses generating means comprises a PLL circuit which can be a horizontal PLL circuit, and the gating pulses generating means can further comprise a vertical integrator. Namely, it is advantageous to supply the gating pulses from a H-PLL and a V-INTEGRATOR for terrestrial noisy conditions.

For good terrestrial picture conditions and in a VCR (video cassette recorder)/STB (set top box) mode via an RF modulator, the gating pulses can be also derived from a conventional sync slicer.

When copy protection (e.g. MACROVISION) in the VCR/STB mode is set, some gating pulses are blanked.

In the following, the present invention will be described in greater detail based on a preferred embodiment with reference to the accompanying drawings in which FIG. 1 shows a schematic block diagram of a preferred embodiment of the a gated digital AGC circuit;

Figure 4:
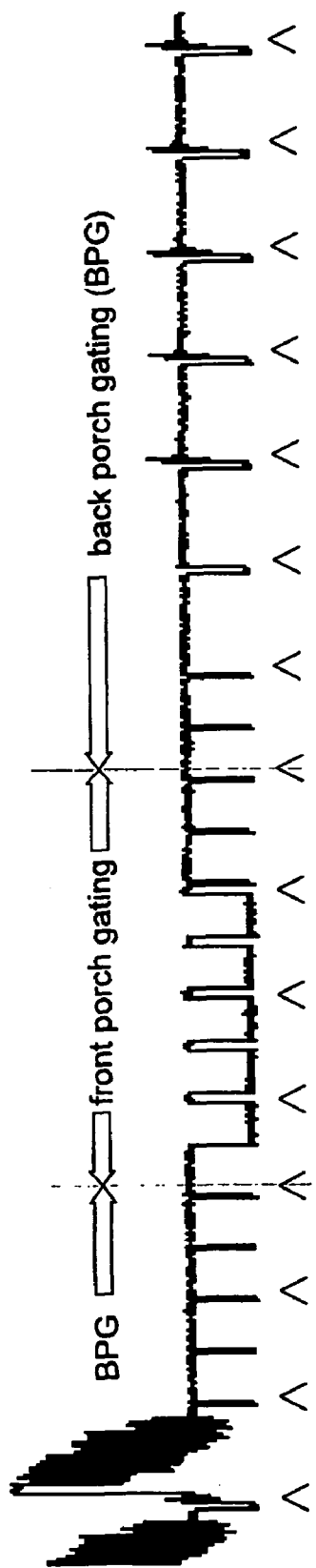
FIG. 4 is a graph showing the waveform of a CVBS signal with front porchgating pulses during the serration pulse region under the occurrence of airplane flutter.
Figure 5:
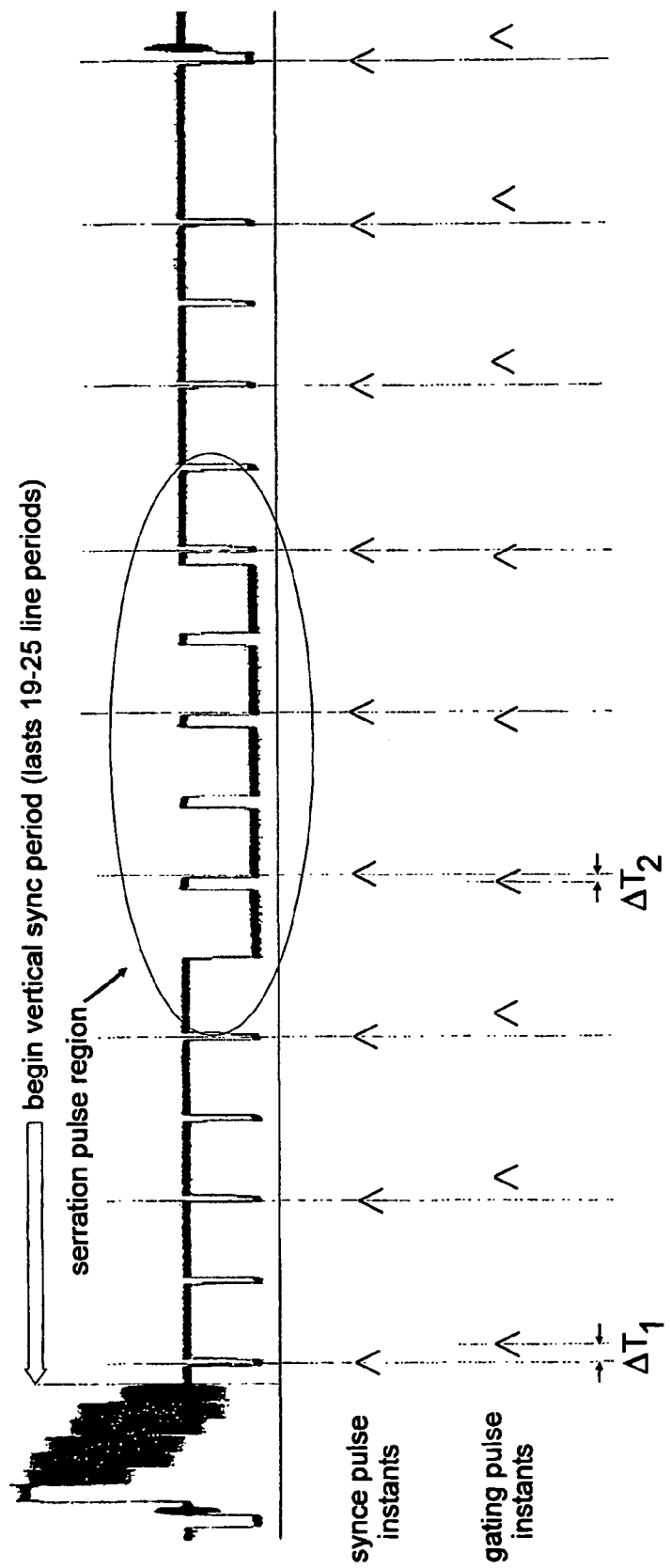
Figure 6:
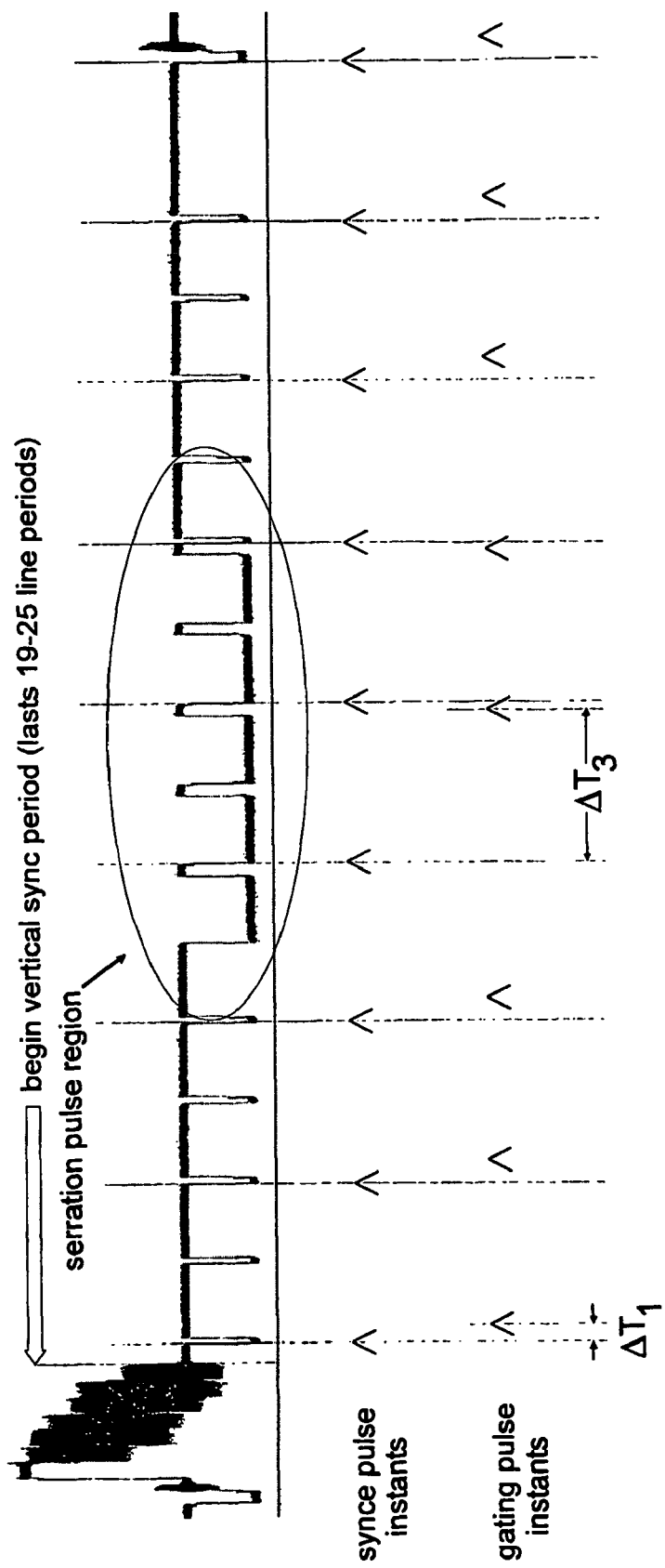

FIG. 5 is a graph showing the waveform of the CVBS signal of FIG. 4 with additional details of timing instants for sync and gating pulses according to a first alternative of a method for changing the gating from back porch to front porch; and FIG. 6 is a graph showing the wave form of the CVBS signal of FIG. 4, but with additional details of timing instants for sync and gating pulses according to a second alternative of a method for changing the gating from back porch to front porch.

Figure 1:
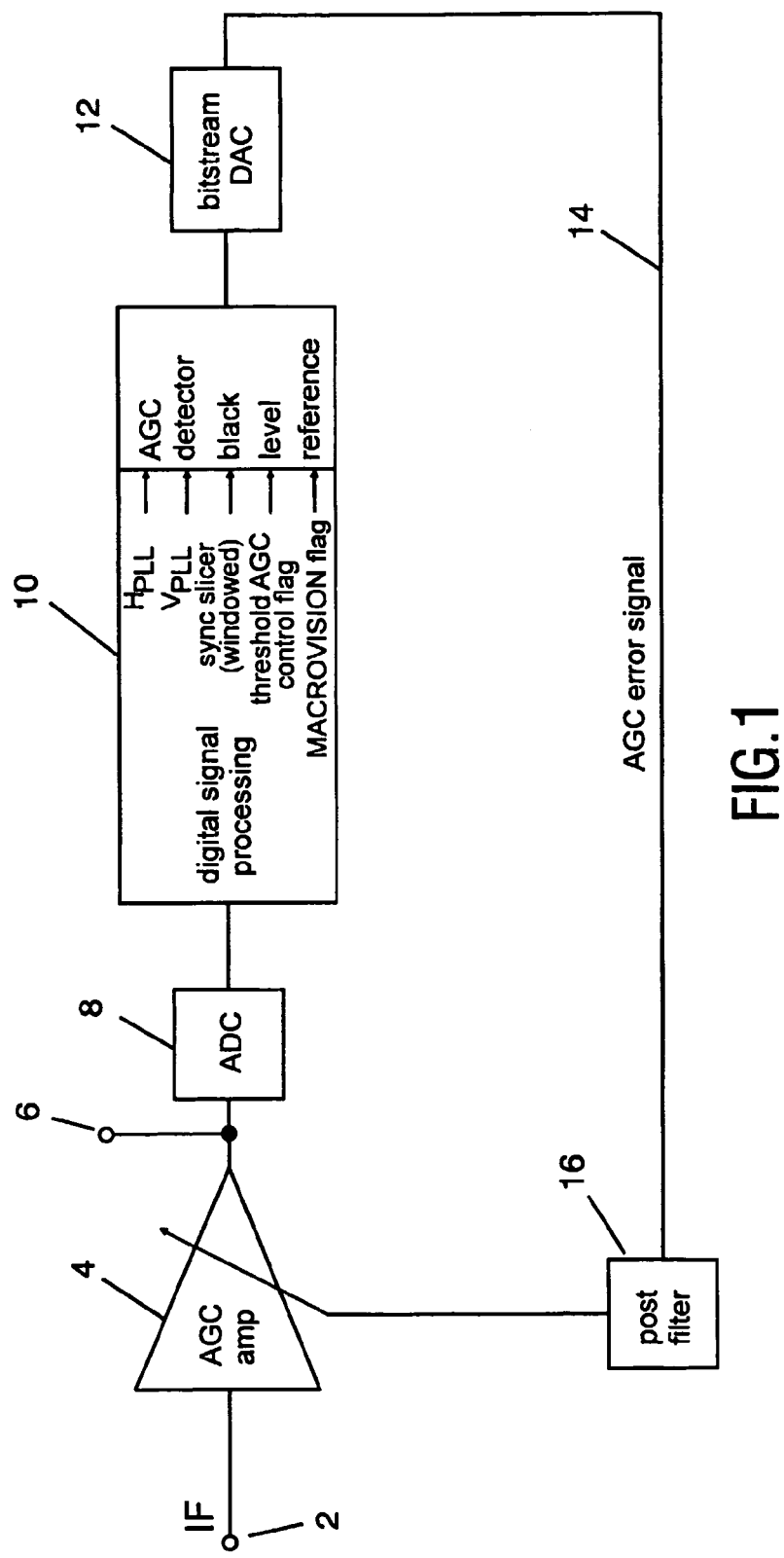

A schematic block diagram of a preferred embodiment of a gated digital AGC (automatic gain control) circuit for analog television receivers is shown in FIG. 1. The shown circuit comprises an input terminal 2 for inputting an IF (intermediate frequency) signal. The input terminal 2 is connected to an input of a controllable analog AGC amplifier 4 whose output is coupled to an output terminal 6 for outputting the gained IF signal. The output of the analog AGC amplifier 4 is further connected to an input of an analog/digital-converter 8 whose output is coupled to an input of a digital signal processing device 10. An output of the digital signal processing device 10 is connected to an input of a bit stream digital/analog-converter 12 whose output is coupled via a feed back loop 14 to an input of an analog non-critical first-order post filter 16. The output signal of the post filter 16 is a control signal for controlling the AGC amplifier 4.

In the digital signal processing device 10, a CVBS (color video blanking sync) signal is generated by demodulation of the inputted IF signal which has been digitized by the analog-digital-converter 8. Further, in the digital signal processing device 10, the horizontal line frequency is derived from the CVBS signal and is used to determine the level at the back porch region of the CVBS signal. This level is compared to a reference level for black. For this purpose, a H-PLL circuit is provided in the digital signal processing device 10. The difference between the level at the back porch region of the CVBS signal and the reference level for black is the resulting loop gain error which is integrated in the digital signal processing device 10. So, gating pulses are produced by being supplied from a H-PLL and V-INTEGRATOR. However, this is mainly for terrestrial noisy conditions. For good terrestrial picture conditions and in VCR (video cassette recorder)/STB (set top box) mode via an RF modulator, some gating pulses are derived from a conventional sync slicer which is also included in the digital signal processing device 10. When a copy protection (e.g. MACROVISION) from VCR or STB is set, some gating pulses are blanked. For this purpose, a corresponding flag is set in the digital signal processing device 10.

A multi-bit AGC error signal is outputted from the digital signal processing device 10, converted into an analog signal by the digital/analog-converter 12 and applied as an AGC error signal to the AGC amplifier 4 via the feed back loop 14 and the post filter 16 in order to keep the output signal of the AGC amplifier 4 constant.

Figure 2:
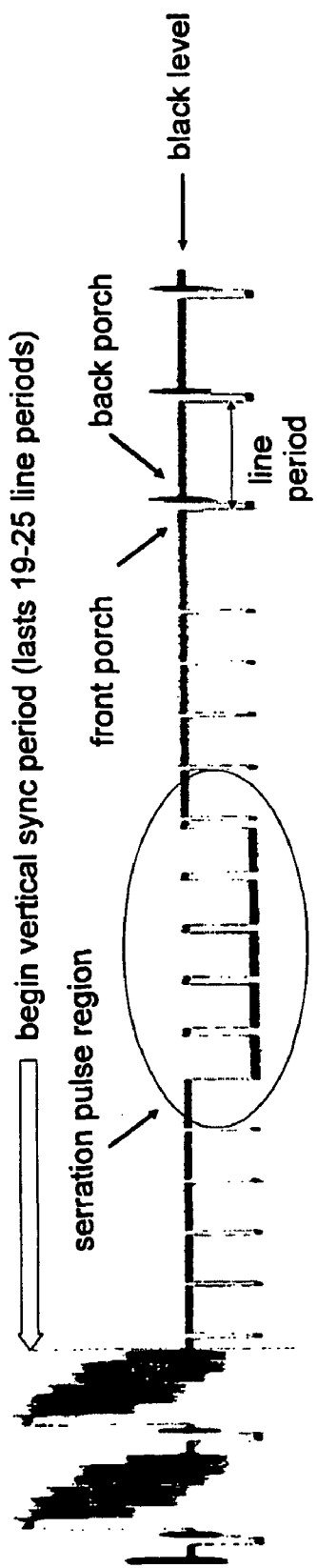
FIG. 2 is a graph showing the waveform of a CVBS signal without airplane flutter.

The occurrence of the gating pulses is synchronized with the back porch region of the horizontal sync pulses. However, a critical time period is the serration pulse region forming part of the vertical sync period wherein serration pulses occur which have no back porch region. In FIG. 2, it is shown the waveform of the CVBS signal without influence of airplane flutter and in particular the waveform of the CVBS signal during the beginning of the vertical sync period including the serration pulse region.

Figure 3:
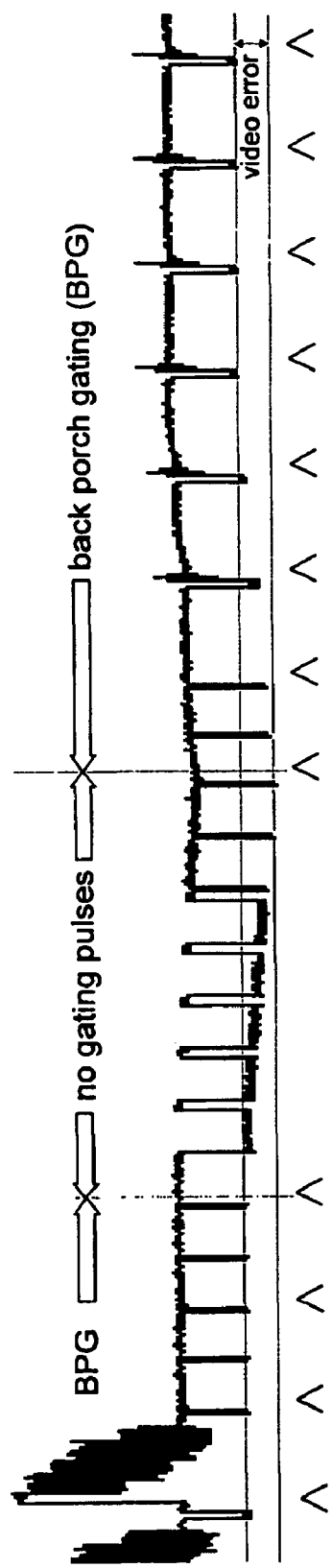
FIG. 3 is a graph showing the waveform of a CVBS signal with no gating pulses during the serration pulse region under the influence of airplane flutter (prior art)

State of the art is either keeping the horizontal gating procedure or freezing it during the serration pulse region. Also known is the disabling of the gating during the serration pulse region. The result is a wrong AGC action in an annoying way in case a fast AGC response is required. Namely, a high speed response is necessary to control the outputted CVBS signal during airplane flutter (changing multi-path reception) and keep it on a constant level anytime. However, when the gating is interrupted during the serration pulse region, which lasts 2.5 to 3 line periods for all television standards, the AGC cannot react to airplane flutter during that critical time. As a consequence, the level of the outputted CVBS signal will vary accordingly, resulting in a changing picture contrast or even loss of synchronization. This situation is depicted in FIG. 3 showing the waveform of the CVBS signal under the influence of airplane flutter (80% AM, 80 Hz) and further showing the gating pulses indicated as upright arrows below the CVBS waveform.

To overcome this unwanted effect, the digital signal processing device 10 changes the gating from back porch to front porch during the serration pulse region. So, the serration pulse region is gated with three time-shifted horizontal sync pulses by taking the error signal from the front porch measurement. In the digital domain this can be done with high accuracy. So, the AGC loop stays closed all the time and can thus function with good performance. This situation is depicted in FIG. 4 showing the waveform of the CVBS signal under the occurrence of airplane flutter (80% AM, 80 Hz) and further showing the gaiting pulses indicated as upright arrows below the CVBS waveform, wherein front porch gating is carried out during the serration pulse region.

FIG. 5 shows more details of the timing instants for the sync and gaiting pulses with reference to FIG. 4. In particular, FIG. 5 shows in more detail that during back porch gating the gating pulses occur a time distance $\Delta T1$ after the occurrence of the sync pulses, whereas during the serration pulse region when front porch gating is carried out the gating pulses occur a time distance $\Delta T2$ before the occurrence of the sync pulses. So, according to FIG. 5 the gating pulses occur earlier by a time interval corresponding to the total time distance $\Delta T1+\Delta T2$ to hit the front porch regions during the serration pulse region.

FIG. 6 shows an alternative method of changing from back porch gating to front porch gating wherein the gating pulses are delayed by a time interval $\Delta T3$ behind the occurrence of the sync pulses to hit the next front porch region and the subsequent front porch regions during the serration pulse region. So, in the situation of FIG. 6, the gating pulses occur later by a time interval corresponding to the time distance $\Delta T3-\Delta T1$ between the first back porch region and the next front porch region within the serration pulse region so as to change from back porch gating to front porch gating. With respect thereto, it should be added that apart from the different kind of changing from back porch gating to front porch gating, the situation of FIG. 6 is the same as that of FIGS. 4 and 5.

After all, FIGS. 4 to 6 clearly show that the airplane flutter does not have any negative influence on the waveform of the CVBS signal.

As it becomes clear from the above description, the digital signal processing device 10 (FIG. 1) includes inter alia the function of an AGC detector.

Finally, three general cases be distinguished:

1) Noisy Terrestrial Reception Mode:

The gating pulses are derived from a H-PLL and V-INTEGRATOR which are included in the digital signal processing device 10 (FIG. 1). Moreover, the AGC loop bandwidth is made small (reduced AGC speed) to cope with noise spikes. The airplane flutter is masked by noise in that case.

2) Good Terrestrial Reception and VCR/STB Mode:

A threshold detector senses the AGC voltage in the digital domain to monitor the IF (intermediate frequency) level. A flag is set, when the IF level is so high as to expect a good, nearly noise-free picture quality. During most of the active lines, carrying video information, the H-PLL supplies the gating pulses. However due to the VCR head switching, even the fast H-PLL looses tracking for some lines because of timing jitter. Therefore, an ordinary sync slicer must be employed in the digital signal processing device 10 (FIG. 1). The VCR head switching happens before the vertical sync period. So, the sync slicer provides gating pulses for 20 line periods (as an example) plus the vertical sync period which results in 39 to 45 line periods in total.

3) Mode Like in 2), but with MACROVISION Copy Protection:

This situation is detected in a special circuit that finds out whether any copy protection pulses occur. In that case, the H-PLL gating pulses are interrupted during the vertical sync period (this is the period during which MACROVISION copy protection signals can occur). This can be done, because no airplane flutter is expected in case of a MACROVISION protected signal.

Although, the invention is described above with reference to an example shown in the attached drawings, it is apparent that the invention is not restricted to it, but can vary in many ways within the scope disclosed in the attached claims.

The invention claimed is:

1. An AGC (automatic gain control) detector device for television receivers displaying video pictures consisting of a plurality of horizontal lines to be built up successively, comprising means for inputting a CVBS (color video blanking sync) signal which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period, means for generating gating pulses having a period which is equal to the line period of the horizontal sync pulses, and means for adjusting said gating pulses such that they occur at the back porch region ($\Delta T1$) relative to the horizontal sync pulses, characterized by means for shifting the occurrence of said gating pulses during the serration pulse region of the vertical sync period so that the gating pulses occur earlier by a time interval corresponding to the time distance ($\Delta T1+\Delta T2$) between a front porch region and the next back porch region or later by a time interval corresponding to the time distance ($\Delta T3-\Delta T1$) between a back porch region and the next front porch region.

2. The device according to claim 1, further characterized by first means for detecting the occurrence of the back porch region of the horizontal sync pulses, and second means for detecting the occurrence of the front porch region of the horizontal sync pulses, wherein said first and second detecting means are coupled to said shifting means, and at least said first detecting means is coupled to said adjusting means.

3. The device according to claim 1, wherein the device is a digital AGC detector device.

4. The device according to claim 1, wherein the device is provided for analog television receivers.

5. The device according to claim 1, wherein said gating pulses generating means comprises a PLL circuit.

6. The device according to claim 5, wherein said PLL circuit is H-PLL circuit, and said gating pulses generating means further comprises a V-INTEGRATOR.

7. The device according to at least any one of claim 1, wherein said gating pulses generating means comprises a sync slicer.

8. A method for AGC (automatic gain control) detecting for television receivers displaying video pictures consisting of a plurality of horizontal lines to be built up successively, comprising the steps of inputting a CVBS (color video blank sync) signal which includes horizontal sync pulses having a front porch region and a back porch region and occurring once a horizontal line during a horizontal sync period when generating a current video picture, and further includes vertical sync pulses occurring during a vertical sync period before the generation of a new video picture and including serration pulses which occur during a serration pulse region being part of the vertical sync period, generating gating pulses having a period which is equal to the line period of the horizontal sync pulses, and adjusting said gating pulses such that they occur at the back porch region ($\Delta T1$) relative to the horizontal sync pulses, characterized by the further step of shifting the occurrence of said gating pulses during the serration pulse region of the vertical sync period so that the gating pulses occur earlier by a time interval corresponding to the time distance ($\Delta T1 \times \Delta T2$) between a front porch region and the next back porch region or later by a time interval corresponding to the time distance ($\Delta T3 - \Delta T1$) between a back porch region and the next front porch region.

9. The method according to claim 8, wherein at least the step of shifting the occurrence of said gating pulses during the serration pulse region is carried out in the digital domain.

10. The method according to claim 8, wherein the method is provided for analog television reception.

* * * * *